US012374205B2

(12) United States Patent
Tsurumi et al.

(10) Patent No.: US 12,374,205 B2
(45) Date of Patent: Jul. 29, 2025

(54) HEAT DETECTOR

(71) Applicant: Hochiki Corporation, Tokyo (JP)

(72) Inventors: Hayato Tsurumi, Tokyo (JP); Bo Fu, Tokyo (JP)

(73) Assignee: Hochiki Corporation, Tokyo (JP)

( * ) Notice: Subject to any disclaimer, the term of this patent is extended or adjusted under 35 U.S.C. 154(b) by 14 days.

(21) Appl. No.: 18/546,792

(22) PCT Filed: Feb. 26, 2021

(86) PCT No.: PCT/JP2021/007244

§ 371 (c)(1),
(2) Date: Aug. 17, 2023

(87) PCT Pub. No.: WO2022/180763

PCT Pub. Date: Sep. 1, 2022

(65) Prior Publication Data

US 2024/0304071 A1 Sep. 12, 2024

(51) Int. Cl.
*G08B 17/06* (2006.01)

(52) U.S. Cl.
CPC .................................... *G08B 17/06* (2013.01)

(58) Field of Classification Search
CPC ...................................................... G08B 17/06
See application file for complete search history.

(56) References Cited

U.S. PATENT DOCUMENTS

2024/0304071 A1 * 9/2024 Tsurumi ................. G08B 17/06

FOREIGN PATENT DOCUMENTS

| | | | |
|---|---|---|---|
| JP | H02257399 A | | 10/1990 |
| JP | 04028389 A | | 3/1992 |
| JP | 04028389 U | | 3/1992 |
| JP | H08180273 A | | 7/1996 |
| JP | 2003036488 A | * | 2/2003 |
| JP | 4625046 B2 | | 2/2011 |
| JP | 2019168914 A | * | 10/2019 |
| JP | 6681129 B2 | | 4/2020 |
| WO | 2017177000 A1 | | 10/2017 |

OTHER PUBLICATIONS

PCT Office, International Search Report issued in PCT/JP2021/007244 dated May 25, 2021.

* cited by examiner

*Primary Examiner* — Hoi C Lau

(74) *Attorney, Agent, or Firm* — Wood Herron & Evans LLP

(57) ABSTRACT

A heat detector (1) includes: a detection portion (2) which is exposed to a monitoring area (12) and detects heat; a guard structure (7) which is provided around the detection portion (2) and protects the detection portion (2) from an external force on the side of the monitoring area (12); and an indicator lamp (4) which performs a display relating to the heat detector, wherein in the indicator lamp (4), at least a part includes a planar visible portion (42) inside the guard structure (7) and around the detection portion (2) and at least a part of the visible portion (42) is visible from the side of the monitoring area (12) over the guard structure (7).

17 Claims, 9 Drawing Sheets

HEAT DETECTOR

TECHNICAL FIELD

The present invention relates to a heat detector.

BACKGROUND ART

A heat detector is provided with an indicator lamp which notifies an operation state. In heat detectors disclosed in Patent Documents 1 to 3, an indicator lamp is provided outside a guard structure (thermistor fguard) protecting a detection portion detecting heat in plan view. An LED which is a light source of the indicator lamp and the detection portion are both electrically connected to a built-in mounting board. The plan view shows a state when viewed from the up and down direction.

CITATION LIST

Patent Document

Patent Document 1
  Japanese Patent No. 4625046
Patent Document 2
  Japanese Unexamined Patent Application, First Publication No. H08-180273
Patent Document 3
  Japanese Patent No. 6681129

SUMMARY OF INVENTION

Technical Problem

However, in the heat detectors disclosed in Patent Documents 1 to 3, since the indicator lamp is disposed outside the guard structure in plan view, the LED and the detection portion are located at separate positions and are electrically connected to the mounting board. Accordingly, the mounting board needs to be increased in size and the arrangement of the LED is restricted.

An object of the present invention provides a heat detector capable of miniaturizing a mounting board and reducing the restrictions on the arrangement of a light source device of an indicator lamp.

Solution to Problem

In order to achieve the above-described object, a heat detector according to an aspect of this embodiment includes: a detection portion which is exposed to a monitoring area and detects heat; a guard structure which is provided around the detection portion and protects the detection portion from an external force on the side of the monitoring area; and an indicator lamp which performs a display relating to the heat detector, wherein at least a part of the indicator lamp includes a planar visible portion inside the guard structure and around the detection portion in plan view and at least a part of the visible portion is visible from the side of the monitoring area over the guard structure.

According to this aspect, at least a part of the visible portion is disposed inside the guard structure and around the detection portion in plan view. Accordingly, the light source device of the visible portion is disposed at a position close to the detection portion. Therefore, it is possible to miniaturize the mounting board and to reduce the restrictions on the arrangement of the light source device.

Further, according to this aspect, the visible portion is disposed in a planar shape around the detection portion and at least a part of the visible portion is visible from the side of the monitoring area over the guard structure. Accordingly, the user can easily see the visible portion.

A heat detector according to an aspect of this embodiment includes: a detection portion which is exposed to a monitoring area and detects heat; a guard structure which is provided around the detection portion and protects the detection portion from an external force on the side of the monitoring area; and an indicator lamp which performs a display relating to the heat detector, wherein the indicator lamp includes a planar visible portion which is disposed in an area protected by the guard structure and of which at least a part is exposed while not overlapping the guard structure in plan view.

According to this aspect, the visible portion is disposed in an area protected by the guard structure. Accordingly, the light source device of the visible portion is disposed at a position close to the detection portion. Therefore, it is possible to miniaturize the mounting board and to reduce the restrictions on the arrangement of the light source device of the indicator lamp.

Further, according to this aspect, the visible portion has a planar shape in which at least a part is exposed while not overlapping the guard structure in plan view. Accordingly, the user can easily see the visible portion.

The heat detector according to an aspect of this embodiment may further include: a mounting board to which the detection portion is electrically connected, the indicator lamp may include a light source device which is electrically connected to the mounting board, and the visible portion may display light projected from the light source device.

According to this aspect, since the visible portion and the detection portion are disposed to be close to each other, the electrical connection position of the heat detector and the electrical connection position of the light source device in the mounting board can be close to each other. Accordingly, it is possible to miniaturize the mounting board and to reduce the restrictions on the arrangement of the light source device.)

In the heat detector according to an aspect of this embodiment, the visible portion may be configured by a part of a plate-shaped member including a transparent or opaque light diffusion portion, and the light diffusion portion may be disposed to overlap the mounting board in plan view.

According to this aspect, the visible portion is configured by a part of the plate-shaped member including the transparent or opaque light diffusion portion. Accordingly, the light diffusion portion can diffuse the light of the light source device. Therefore, the visible portion can reliably perform a display relating to the heat detector.

Further, according to this aspect, the light diffusion portion is disposed to overlap the mounting board in plan view. Accordingly, the distance between the light source device and the light diffusion portion electrically connected to the mounting board can be shortened. Therefore, the light of the light source device can be reliably protected to the light diffusion portion.

In the heat detector according to an aspect of this embodiment, the light diffusion portion may be disposed to surround the detection portion.

According to this aspect, the user can easily see the visible portion.

The heat detector according to an aspect of this embodiment may further include: a cover portion which is provided between the mounting board and the guard structure and the cover portion may be provided with an opening that exposes the visible portion.

According to this aspect, the cover portion is provided with an opening that exposes the visible portion. Accordingly, even when the cover portion is provided, the visible portion can be provided around the detection portion so that at least a part is disposed inside the guard structure in plan view.

In the heat detector according to an aspect of this embodiment, at least a part of each of the side of the guard structure facing the visible portion and the cover portion may have a color capable of reflecting visible light emitted from the indicator lamp.

According to this aspect, the guard structure can reflect the visible light emitted from the indicator lamp. Accordingly, the heat detector can perform a display relating to the heat detector by using not only the visible light emitted from the indicator lamp but also the light reflected by the guard structure and the cover portion.

In the heat detector according to an aspect of this embodiment, a waterproof material may be provided between the detection portion and the visible portion.

According to this aspect, it is possible to improve the waterproofness of the detection portion.

In the heat detector according to an aspect of this embodiment, the waterproof material may be an adhesive.

According to this aspect, the visible portion can be adhered to the mounting board around the detection portion or other members.

The heat detector according to an aspect of this embodiment may further include: a mounting board to which the detection portion is electrically connected, a cover portion may be provided between the mounting board and the guard structure, the cover portion may be provided with an opening that exposes the visible portion, the visible portion may be provided with a groove portion into which the adhesive is injectable, and the groove portion may reach between the detection portion and the visible portion and reach the cover portion.

According to this aspect, the adhesive can be charged between the detection portion and the visible portion by injecting the adhesive into the groove portion. Further, the adhesive which is injected into the groove portion and reaches the cover portion can adhere the visible portion and the cover portion.

In the heat detector according to an aspect of this embodiment, a packing may be provided between the visible portion and the mounting board.

According to this aspect, a gap between the visible portion and the mounting board can be closed and water, dust, or the like can be prevented from entering between the visible portion and the mounting board. Further, when the waterproof material is provided between the detection portion and the visible portion, the waterproof material can be prevented from entering between the visible portion and the mounting board.

Advantageous Effects of Invention

According to an aspect of this embodiment, it is possible to miniaturize the mounting board and to reduce the restrictions on the arrangement of the light source device of the indicator lamp.

DESCRIPTION OF EMBODIMENTS

Figure 1:
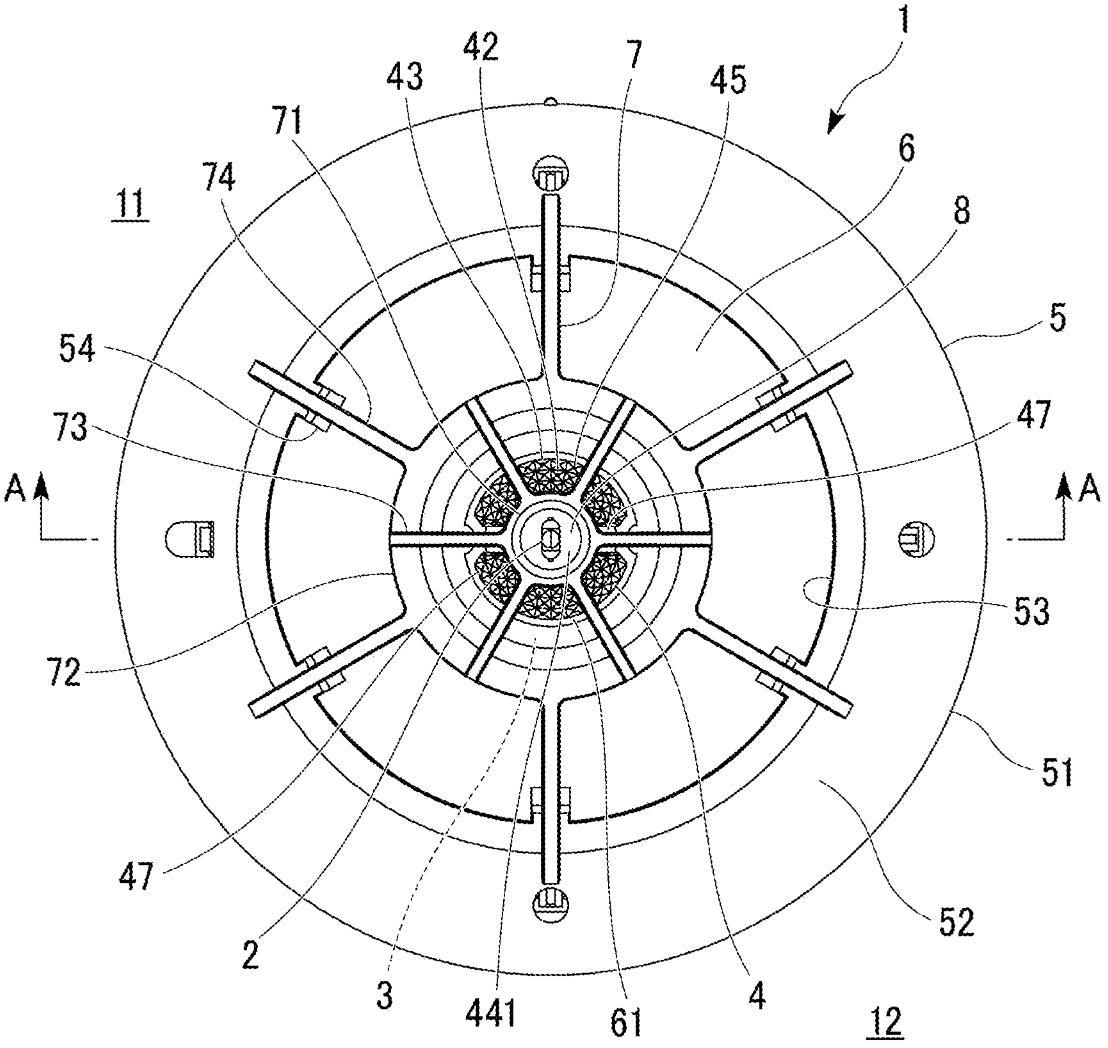
FIG. 1 is a plan view of a heat detector according to a first embodiment.

Hereinafter, embodiments of the present invention will be described with reference to the drawings. In the drawings described below, the same or equivalent components are denoted by the same reference numerals, and overlapping descriptions are omitted.

Figure 2:
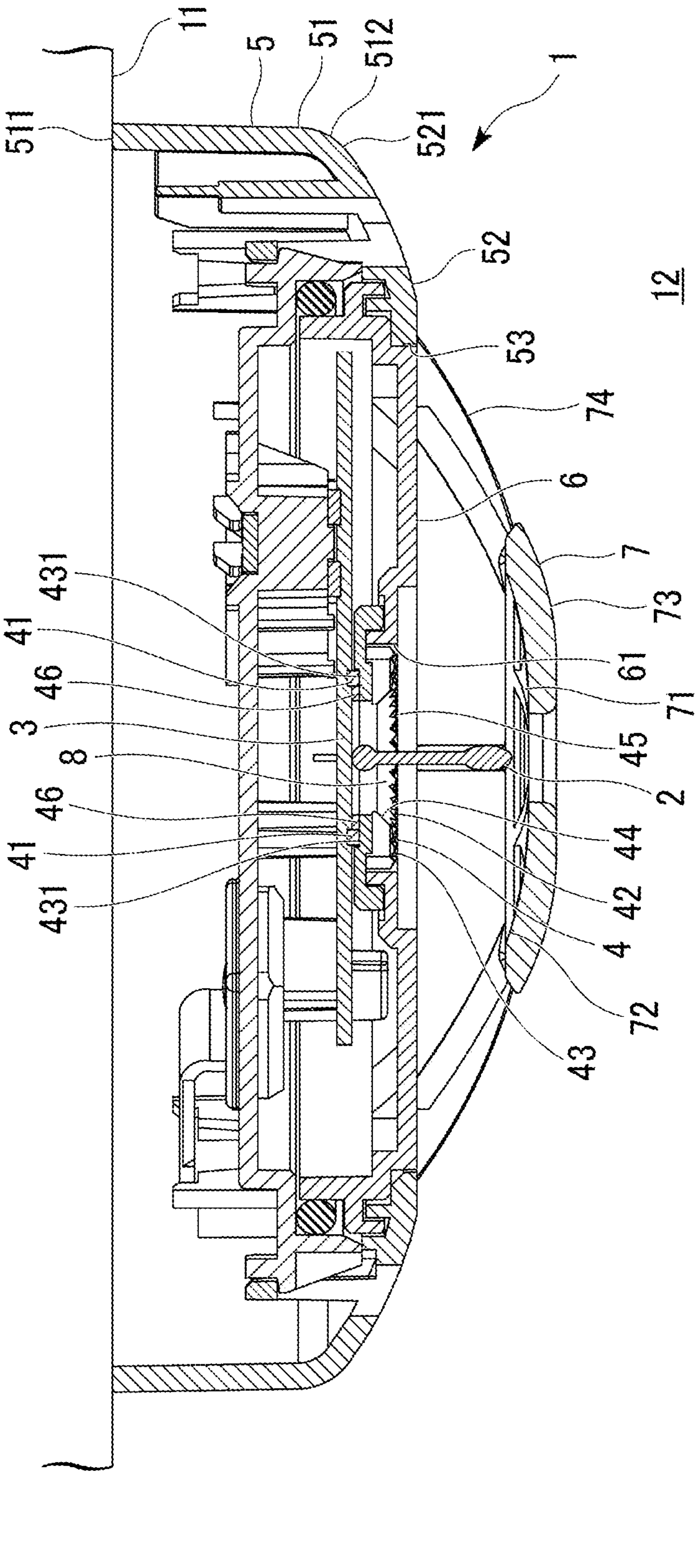
FIG. 2 is a cross-sectional view taken along a line A-A of the heat detector according to the first embodiment.

A heat detector 1 according to the embodiment of the present invention shown in FIGS. 1 and 2 is attached to a ceiling surface 11. The heat detector 1 shown in FIG. 1 shows the lower surface when attached to the ceiling surface 11. The heat detector 1 has a circular shape in plan view when viewed from the up and down direction.

The heat detector 1 includes a detection portion 2, a mounting board 3, an indicator lamp 4, an outer cover portion 5, an inner cover portion 6 (cover portion), and a guard structure 7. The detection portion 2 is exposed to a monitoring area 12 and detects heat. In this embodiment, the monitoring area 12 is an area below and around the heat detector 1 in the lower area of the ceiling surface 11.

Figure 3:
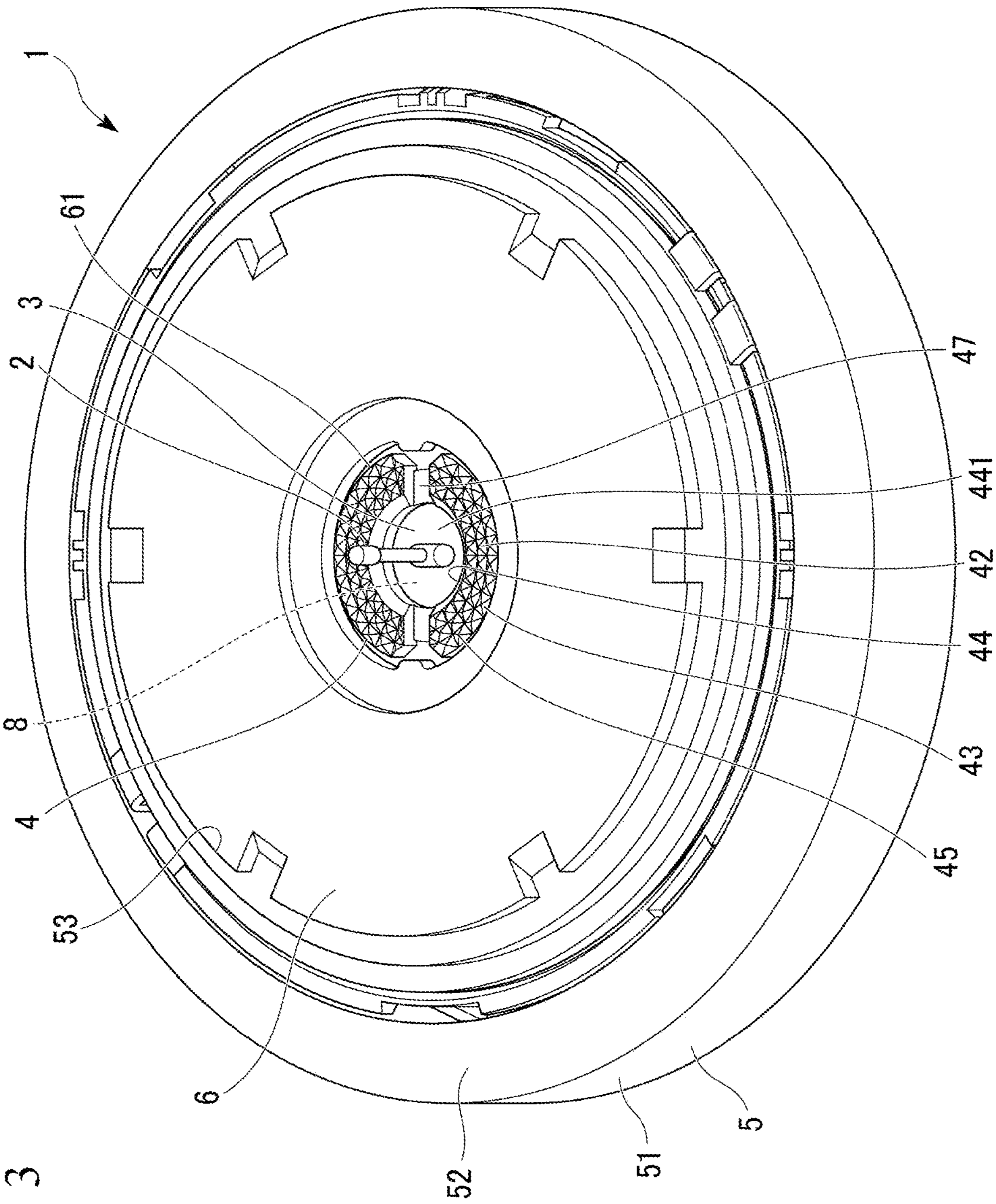
FIG. 3 is a perspective view of the heat detector in which a guard structure is omitted.

As shown in FIGS. 1 to 3, the outer cover portion 5 is provided in an outer peripheral portion of the heat detector 1 in plan view. In FIG. 3, the heat detector 1 is shown upside down and the guard structure 7 is omitted.

The outer cover portion 5 includes a cylindrical portion 51 and an annular portion 52. The cylindrical portion 51 is a cylindrical member. The cylindrical portion 51 is provided on the outer periphery of the heat detector 1 in plan view in a direction that opens in the up and down direction. An upper end portion 511 (see FIG. 2) of the cylindrical portion 51 contacts the ceiling surface 11. The annular portion 52 is an annular member that includes a circular annular portion opening 53 on the inside thereof. In the annular portion 52, an outer peripheral edge 521 (see FIG. 2) is connected to a lower end portion 512 (see FIG. 2) of the cylindrical portion 51 in a direction that opens in the up and down direction. In this embodiment, the cylindrical portion 51 and the annular portion 52 are integrally formed with each other.

The inner cover portion 6 is fitted to the annular portion opening 53 of the annular portion 52. The inner cover portion 6 is an annular member that includes a circular inner cover portion opening 61 on the inside thereof. In the inner cover portion 6, an outer peripheral portion is fixed to the inner peripheral portion of the annular portion 52 in a direction that opens in the up and down direction. The inner cover portion opening 61 is disposed at the center portion of the heat detector 1 in plan view.

As shown in FIG. 2, the mounting board 3 is disposed inside the outer cover portion 5 and above the inner cover portion 6. The mounting board 3 is disposed at the center portion of the heat detector 1 in plan view. A part of the mounting board 3 is disposed above the inner cover portion opening 61 in the vertical direction and a part thereof is disposed above the inner cover portion 6 in the vertical direction. Components of the heat detector 1 such as a control unit are arranged inside the outer cover portion 5 and above the inner cover portion 6 and a part of them is electrically connected to the mounting board 3.

The detection portion 2 is a detection element that detects temperature by heat or hot air flow. The detection portion 2 is a bar-shaped member. The detection portion 2 is disposed at the center portion of the heat detector 1 in plan view in a direction that extends in the up and down direction. The detection portion 2 penetrates the inner cover portion opening 61. The upper side of the detection portion 2 is electrically connected to the mounting board 3. The lower side of the detection portion 2 protrudes downward in relation to the inner cover portion 6.

The indicator lamp 4 displays the operation of the detection portion 2. The indicator lamp 4 includes a light source device 41 (see FIG. 2) and a visible portion 42. The light source device 41 is, for example, an LED element and is electrically connected to the mounting board 3. The indicator lamp 4 of this embodiment includes two light source devices 41. The light source devices 41 are arranged on both sides of the detection portion 2 in a sandwiched state in plan view.

Figure 4:
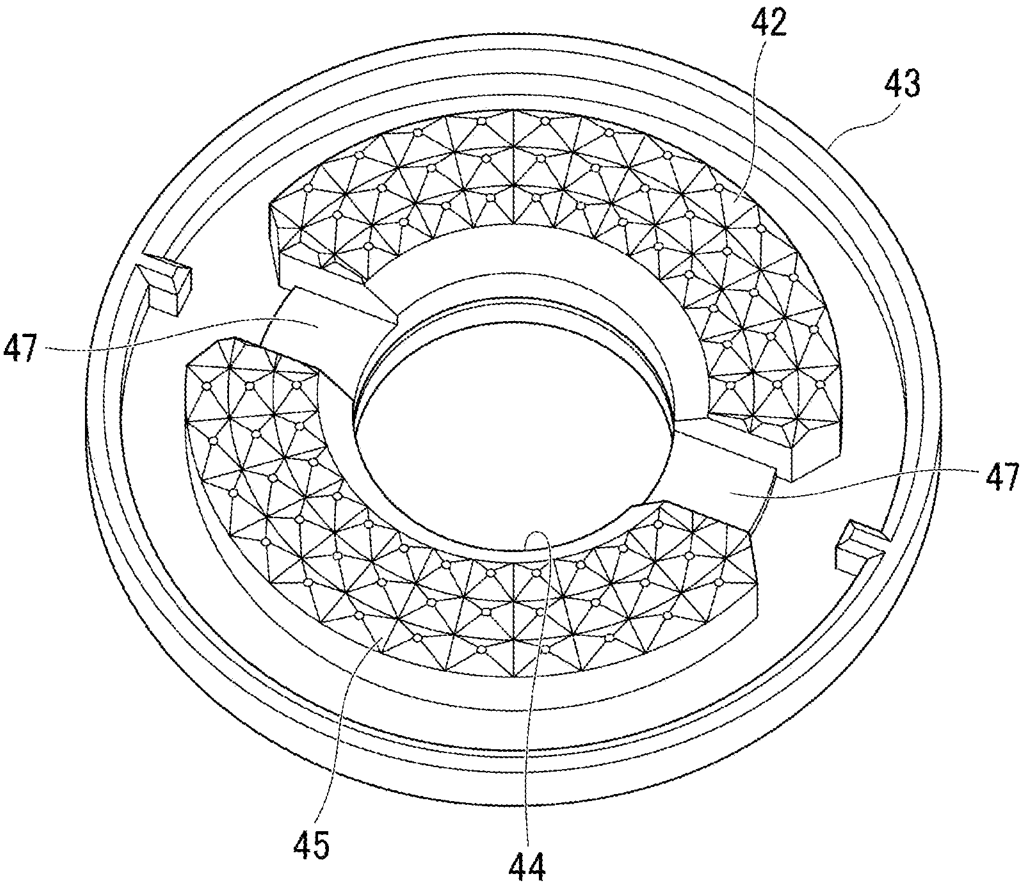
FIG. 4 is a perspective view of a plate-shaped member.

The visible portion 42 is configured by a part of a plate-shaped member 43. As shown in FIG. 4, the plate-shaped member 43 is an annular or plate-shaped member that includes a circular plate-shaped member opening 44 on the inside thereof. In FIG. 4, the plate-shaped member 43 is oriented so that the surface on the lower side when installed on the ceiling surface is on the upper side. The plate-shaped member 43 is disposed in a direction that opens in the up and down direction. As shown in FIGS. 1 to 3, the plate-shaped member 43 is disposed to surround the detection portion 2 in plan view while the detection portion 2 is inserted through the plate-shaped member opening 44. The plate-shaped member 43 includes a transparent or opaque light diffusion portion 45. The light diffusion portion 45 has a large number of reflection surfaces that reflect light, and diffuses the light reflected by each of the large number of reflection surfaces.

As shown in FIG. 2, the plate-shaped member 43 is disposed on the lower side of the mounting board 3 in the vertical direction with an annular packing 46 interposed therebetween. The packing 46 is disposed between the inner portion of the plate-shaped member 43 in plan view and the mounting board 3.

The light source device 41 is electrically connected to the mounting board 3 on the upper side of the light diffusion portion 45 of the plate-shaped member 43 in the vertical direction. Light projected from the light source device 41 travels downward and passes through the light diffusion portion 45 of the plate-shaped member 43. In this embodiment, the light source device 41 protrudes downward from the mounting board 3. The plate-shaped member 43 is provided with a concave portion 431 into which the light source device 41 protruding from the mounting board 3 is inserted. By inserting the light source device 41 into the concave portion 431 of the plate-shaped member 43, the plate-shaped member can be easily positioned.

The inner cover portion 6 is disposed on the lower side of the plate-shaped member 43. In the plate-shaped member 43, an inner portion in plan view is disposed inside the inner cover portion opening 61 and an outer portion in plan view is disposed to overlap the upper side of the inner cover portion 6.

The lower surface of the plate-shaped member 43 is provided with a groove portion 47 that extends in the radial direction. In this embodiment, two groove portions 47 are provided. In the groove portion 47, an inner end portion in plan view reaches the mounting board 3 around the detection portion 2 and an outer end portion reaches an inner peripheral edge 62 of the inner cover portion 6 (the edge portion of the inner cover portion opening 61).

As shown in FIGS. 1 and 3, an adhesive 8 is charged into the lower side of the mounting board 3 around the detection portion 2 in the groove portion 47 of the plate-shaped member 43 and an inside 441 of the plate-shaped member opening 44. By the adhesive 8, the mounting board 3, the plate-shaped member 43, and the inner cover portion 6 are adhered with the adhesive 8.

Further, the adhesive 8 is also waterproof. The adhesive 8 seals the detection portion 2 and the mounting board 3 around the detection portion 2 to ensure waterproofness.

As shown in FIGS. 1 and 2, the guard structure 7 is a member such as a thermistor guard which is provided around the detection portion 2 and protects the detection portion 2 from an external force the side of the monitoring area. The guard structure 7 is disposed on the lower side of the inner cover portion 6 and is supported by the outer cover portion 5. The guard structure 7 includes an inner ring 71, an outer ring 72, an inner rib 73, and an outer rib 74.

The inner ring 71 is an annular member. The inner ring 71 is disposed on the lower side of the detection portion 2 in a direction that opens in the up and down direction. The center of the inner ring 71 is disposed to overlap the detection portion 2 in plan view.

The outer ring 72 is an annular member that is larger than the inner ring 71. The outer ring 72 is disposed coaxially with the inner ring 71 in a direction that opens in the up and down direction. The inner peripheral edge of the outer ring 72 and the outer peripheral edge of the inner ring 71 are arranged with a gap therebetween. The outer ring 72 is located on the upper side in relation to the inner ring 71. The detection portion 2 is disposed inside the inner ring 71.

The inner rib 73 connects the inner ring 71 and the outer ring 72. The inner rib 73 is a bar-shaped member. A plurality of the inner ribs 73 are provided. The plurality of inner ribs 73 are arranged at intervals in the circumferential direction in the direction that extends in the radial direction from the inner ring 71 toward the outer ring 72 in plan view. In each of the plurality of inner ribs 73, one end portion is connected to the inner ring 71 and the other end portion is connected to the outer ring 72.

The outer rib 74 is connected to the outer ring 72 and is fixed to the outer cover portion 5. The outer rib 74 is a bar-shaped member. A plurality of the outer ribs 74 are provided. The plurality of outer ribs 74 extend radially outward from the outer ring 72 in plan view and are provided at intervals in the circumferential direction. In each of the plurality of outer ribs 74, one end portion is connected to the outer ring 72 and the other end portion is fixed to the outer cover portion 5. The annular portion 52 of the outer cover portion 5 is provided with a fixing portion 54 (see FIG. 1) which fixes the outer rib 74 to the edge portion of the annular portion opening 53.

In the guard structure 7, the inside of the inner ring 71, the gap between the radially adjacent inner ribs 73 between the inner ring 71 and the outer ring 72, and the gap between the radially adjacent outer ribs 74 between the outer rib 74 and the outer cover portion 5 are opened. Air is allowed to pass through this opened portion. The guard structure 7 is disposed inside the annular portion opening 53 of the outer cover portion 5 in plan view.

The opening between the inner ribs 73 and the opening between the outer ribs 74 are designed to be large enough to prevent fingers from entering.

Both the inner rib 73 and the outer rib 74 are arranged on the inside in relation to the inner peripheral edge of the outer cover portion 5 in plan view. The inner rib 73 is disposed on the inside in relation to the inner peripheral edge 62 of the inner cover portion 6 in plan view. The outer rib 74 is disposed on the outside in relation to the inner peripheral edge 62 of the inner cover portion 6 in plan view. A portion disposed inside the inner cover portion opening 61 in the visible portion 42 (plate-shaped member 43) is disposed inside the outer ring 72 in plan view. The inner peripheral edge of the visible portion 42 almost overlaps the inner ring 71 in plan view. That is, the visible portion 42 is disposed between the outer ring 72 and the inner ring 71 and at least a part thereof is exposed to the monitoring area 12 while not overlapping the guard structure 7 and is able to be seen by the user from the monitoring area 12 over the guard structure 7.

The light source device 41 is disposed at a position not overlapping the portion disposed inside the inner cover portion opening 61 in the visible portion 42, that is, the inner cover portion 6 in the up and down direction. Therefore, the light source device 41 is also disposed inside the outer ring 72 in plan view.

Next, a method of manufacturing the heat detector 1 according to this embodiment will be described.

Figure 5:
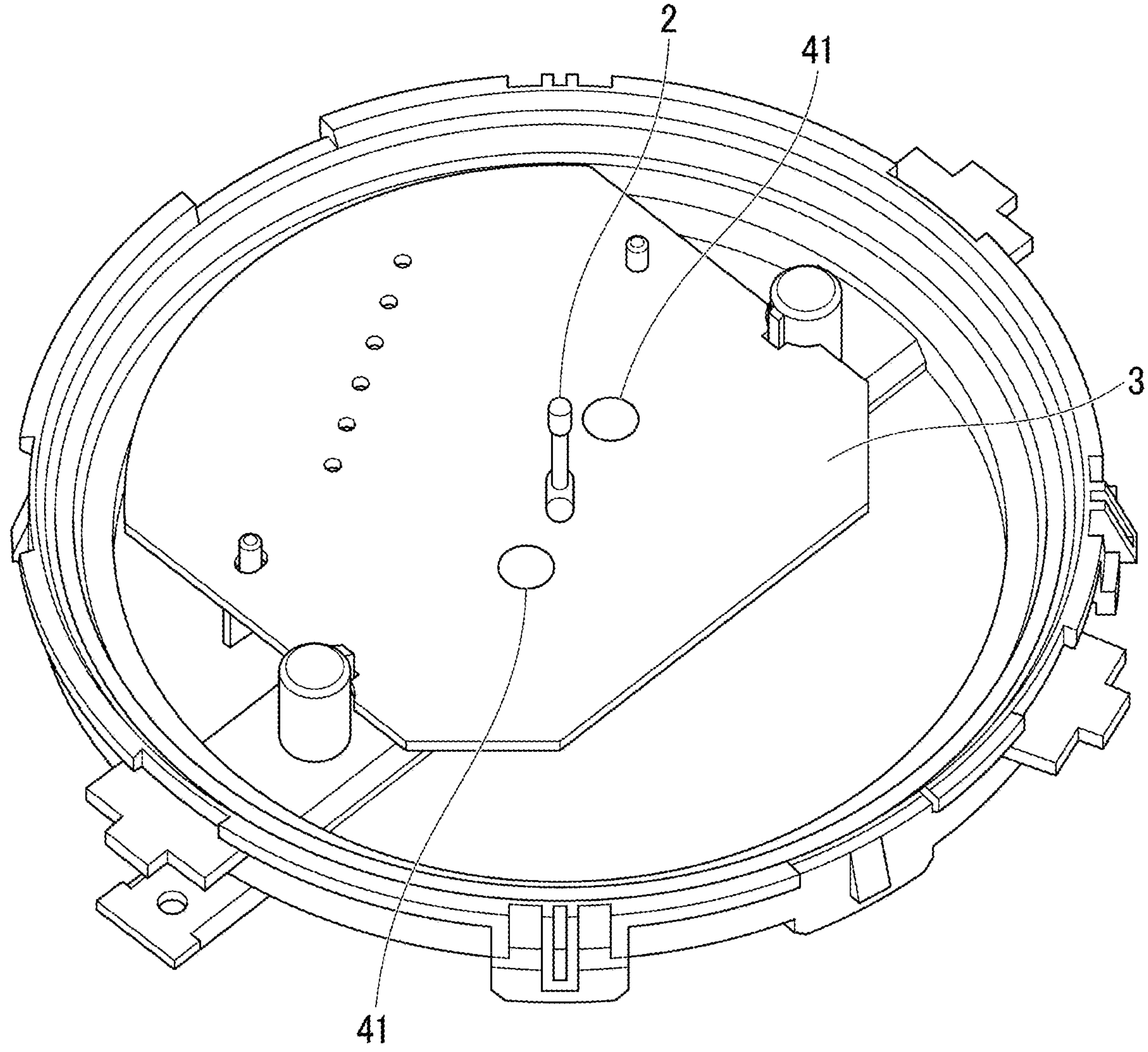
FIG. 5 is a perspective view showing the heat detector before the plate-shaped member is installed on a mounting board.

The mounting board 3, the detection portion 2, and the light source device 41 are manufactured by a known method and are assembled as shown in FIG. 5.

Figure 6:
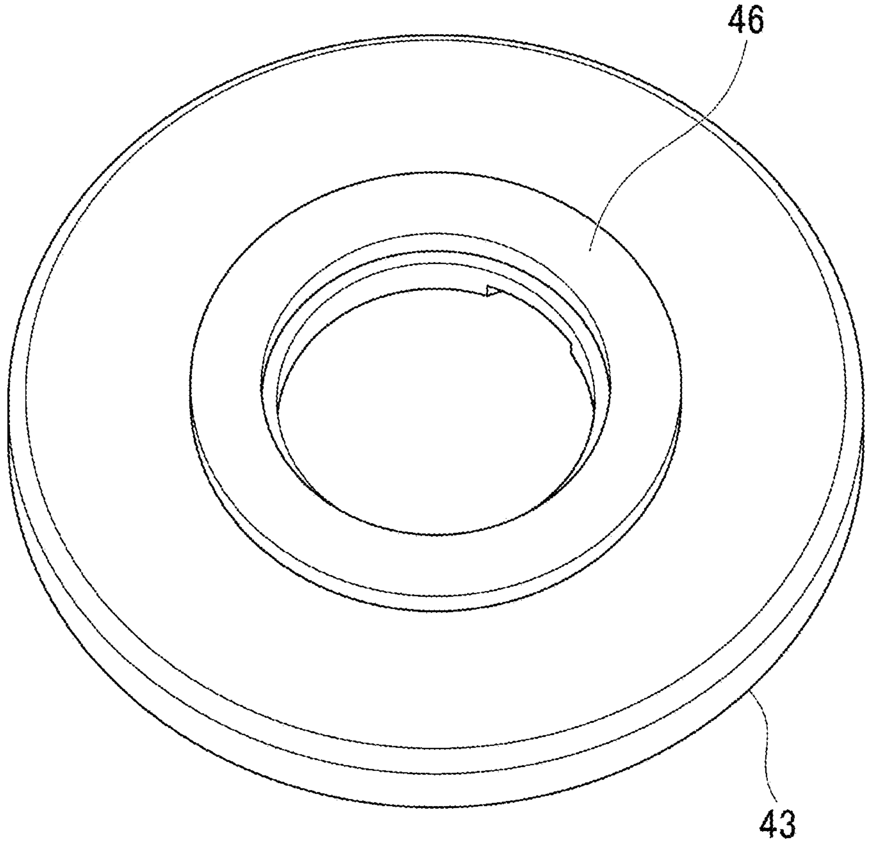
FIG. 6 is a perspective view showing the plate-shaped member to which a packing is attached.

As shown in FIG. 6, the packing 46 is bonded to the surface of the plate-shaped member 43 on the upper side (the surface facing the mounting board 3). The packing 46 is bonded to the inner portion of the plate-shaped member 43 in plan view.

At the time of assembly, the heat detector 1 is disposed so that the top and bottom of the heat detector are opposite to the installation direction on the ceiling. That is, the heat detector is disposed so that the upper side when attached to the ceiling is the lower side and the lower side when attached to the ceiling is the upper side.

Figure 7:
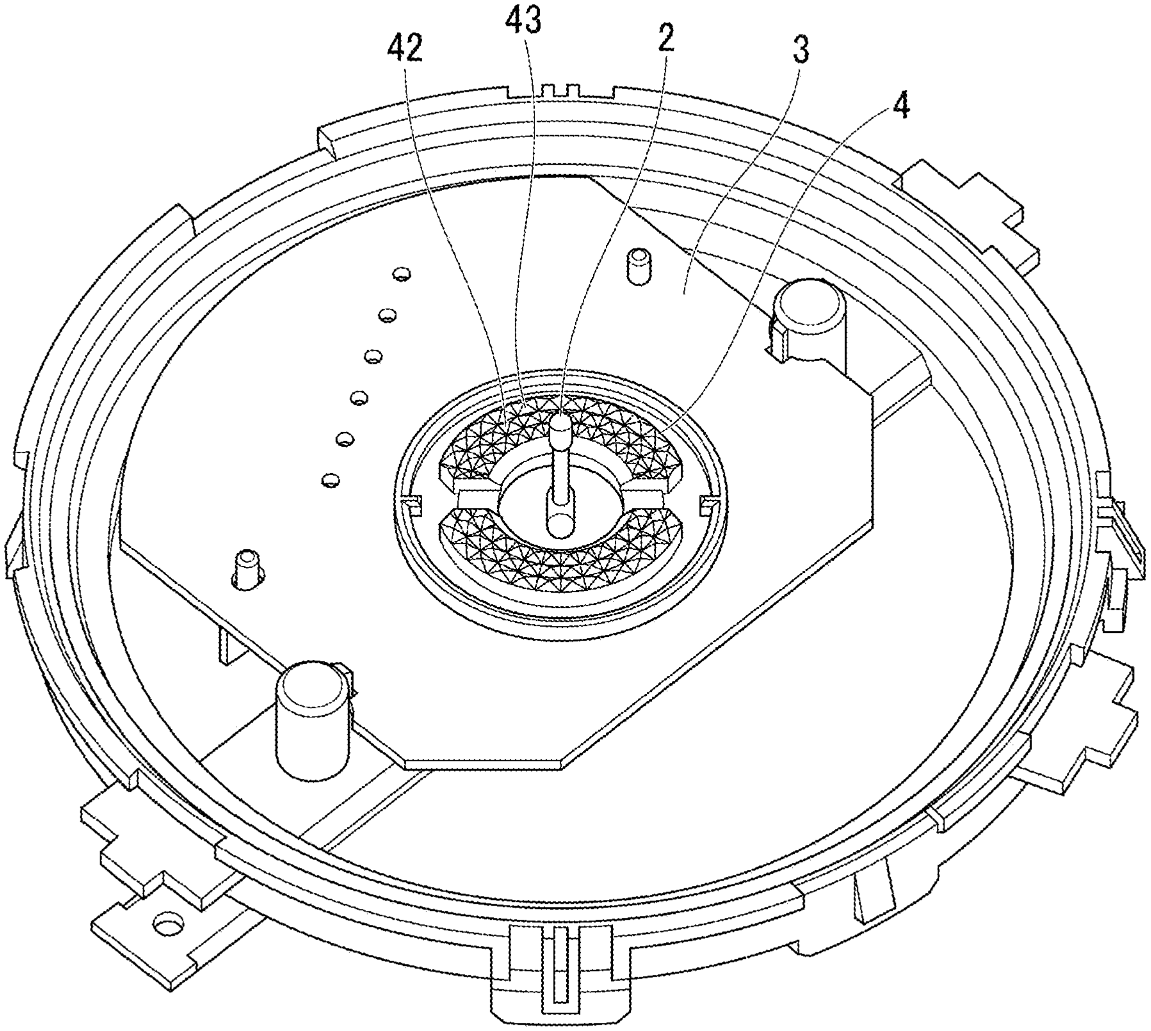
FIG. 7 is a perspective view showing the heat detector after the plate-shaped member is installed on the mounting board.

As shown in FIG. 7, the plate-shaped member 43 is installed on the mounting board 3 so that the packing 46 contacts the mounting board 3. The detection portion 2 is disposed inside the plate-shaped member 43.

Figure 8:
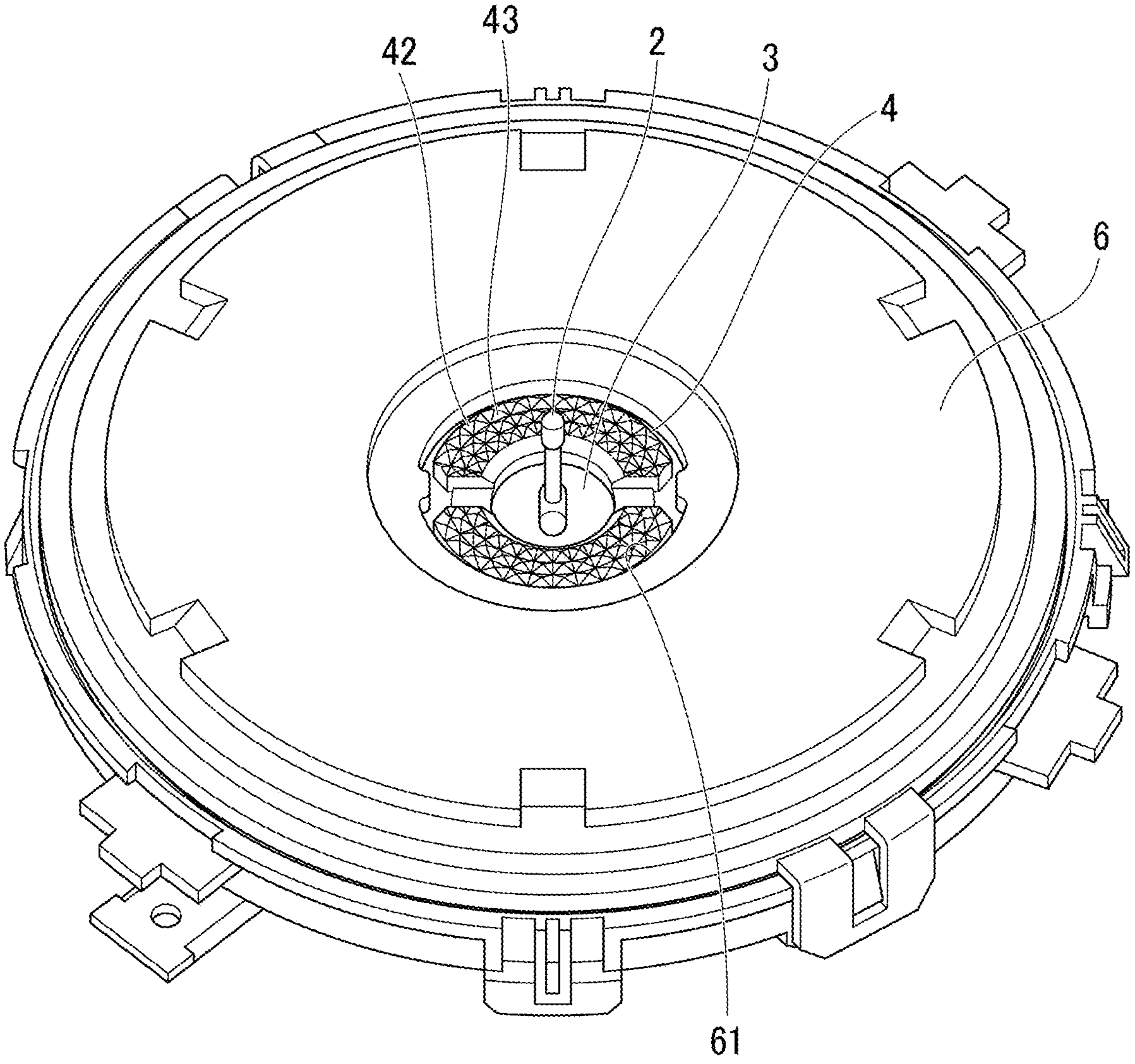
FIG. 8 is a perspective view showing the heat detector after an inner cover portion is installed.

As shown in FIG. 8, the inner cover portion 6 is installed. The inner cover portion 6 is disposed on the mounting board 3 and the plate-shaped member 43 and the plate-shaped member 43, the detection portion 2, and a portion around the detection portion 2 in the mounting board 3 are exposed from the inner cover portion opening 61.

Figure 9:
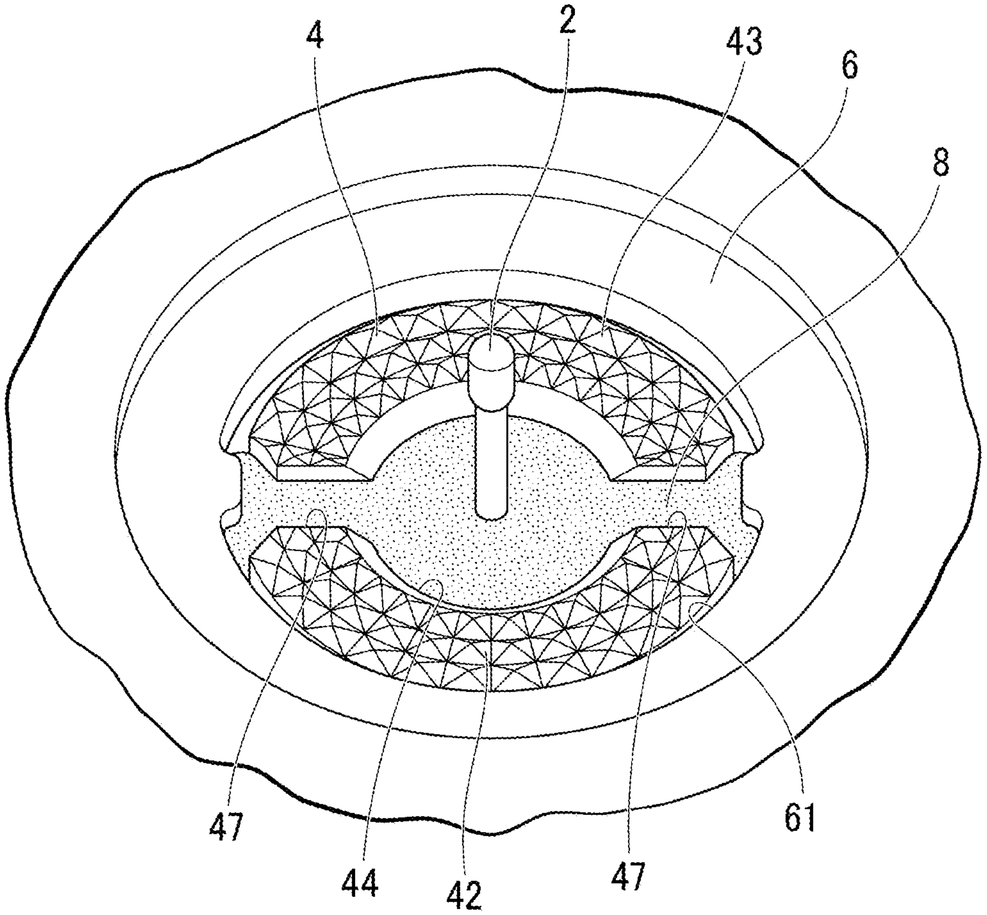
FIG. 9 is a perspective view showing a state in which an adhesive is injected.

As shown in FIG. 9, the adhesive 8 is injected into the groove portion 47 of the plate-shaped member 43 and the adhesive 8 is charged into the groove portion 47 and the inside of the plate-shaped member opening 44 of the plate-shaped member 43. The adhesive 8 is cured.

The outer cover portion 5 and the guard structure 7 are attached to the mounting board 3, the detection portion 2, the indicator lamp 4, and the inner cover portion 6 and the guard structure 7 is disposed at a position overlapping the detection portion 2, the visible portion 42 (plate-shaped member 43), and the detection portion 2. In this way, the heat detector 1 is manufactured.

According to the heat detector 1 of the embodiment of the present invention, at least a part of the visible portion 42 is disposed inside the guard structure 7 and around the detection portion 2 in plan view and at least a part of the visible portion 42 is visible from the side of the monitoring area 12 over the guard structure 7. Accordingly, the light source device 41 is disposed at a position close to the detection portion 2. Therefore, it is possible to miniaturize the mounting board 3 and to reduce the restrictions on the arrangement of the light source device 41.

Further, according to this aspect, the visible portion 42 is disposed in a planar shape around the detection portion 2 and at least a part of the visible portion 42 is visible from the side of the monitoring area 12 over the guard structure 7. Accordingly, the user can easily see the visible portion 42.

Further, according to the heat detector 1 of the embodiment of the present invention, the visible portion 42 is disposed in an area protected by the guard structure. Accordingly, the light source device 41 is disposed at a position close to the detection portion 2. Therefore, it is possible to miniaturize the mounting board 3 and to reduce the restrictions on the arrangement of the light source device 41.

Further, according to the heat detector 1 of the embodiment of the present invention, the visible portion 42 has a planar shape in which at least a part is exposed while not overlapping the guard structure 7 in plan view. Accordingly, the user can easily see the visible portion 42.

In the heat detector 1 according to the embodiment of the present invention, the visible portion 42 is configured by a part of the plate-shaped member 43 including the transparent or opaque light diffusion portion 45. Accordingly, the light diffusion portion 45 can diffuse the light of the light source device 41. Therefore, the visible portion 42 can reliably perform a display relating to the operation of the detection portion 2.

Further, in the heat detector 1 according to the embodiment of the present invention, the light diffusion portion 45 is disposed to overlap the mounting board 3 in plan view. Accordingly, the distance between the light diffusion portion 45 and the light source device 41 electrically connected to the mounting board 3 can be shortened. Therefore, the light of the light source device 41 can be reliably projected to the light diffusion portion 45.

In the heat detector 1 according to the embodiment of the present invention, the light diffusion portion 45 is disposed to surround the detection portion 2. Accordingly, the user can easily see the visible portion 42.

In the heat detector 1 according to the embodiment of the present invention, the inner cover portion 6 may be provided with the inner cover portion opening 61 that exposes the visible portion 42. Accordingly, even when the inner cover portion 6 is provided, the visible portion 42 can be provided around the detection portion 2 so that at least a part is disposed inside the guard structure 7 in plan view.

In the heat detector 1 according to the embodiment of the present invention, the adhesive 8 (waterproof material) is provided between the detection portion 2 and the visible portion 42. Accordingly, the visible portion 42 can be adhered to the mounting board 3 around the detection portion 2 or other members.

Further, according to the heat detector 1 of the embodiment of the present invention, it is possible to improve the waterproofness of the detection portion 2.

In the heat detector 1 according to the embodiment of the present invention, the visible portion 42 is provided with a groove portion 47 into which the adhesive 8 is injectable and the groove portion 47 reaches between the detection portion 2 and the visible portion 42 and reaches the inner cover portion 6. Accordingly, the adhesive 8 can be charged between the detection portion 2 and the visible portion 42 by injecting the adhesive 8 into the groove portion 47. Further, the adhesive 8 which is injected into the groove portion 47 and reaches the inner cover portion 6 can adhere the visible portion 42 and the inner cover portion 6 together.

In the heat detector 1 according to the embodiment of the present invention, the packing 46 is provided between the visible portion 42 and the mounting board 3. Accordingly, a gap between the visible portion 42 and the mounting board 3 can be closed and water, dust, or the like can be prevented from entering between the visible portion 42 and the mounting board 3. Further, when the waterproof material is provided between the detection portion 2 and the visible portion 42, the waterproof material can be prevented from entering between the visible portion 42 and the mounting board 3.

As described above, preferable embodiments of the present invention have been described, but the present invention is not limited to these embodiments. Additions, omissions, substitutions, and other changes in configuration are possible without departing from the scope of the present invention. The present invention is not limited by the foregoing description, and is only limited by the scope of the appended claims.

In the above-described embodiment, the visible portion 42 is configured by a part of the plate-shaped member 43 including the transparent or opaque light diffusion portion 45 and the light diffusion portion 45 is disposed to overlap the mounting board 3 in plan view. On the other hand, the visible portion 42 may not be configured by the plate-shaped member 43 including the light diffusion portion 45 if the light of the light source device 41 can be projected and displayed. Further, the shape of the visible portion 42 may not be the plate shape or the annular shape.

In the above-described embodiment, the light diffusion portion 45 is disposed to surround the detection portion 2. On the other hand, when the visible portion 42 is disposed around the detection portion 2, the light diffusion portion 45 may not be disposed to surround the detection portion 2.

In the above-described embodiment, the heat detector includes the inner cover portion 6 which is provided between the mounting board 3 and the guard structure 7 and the inner cover portion 6 is provided with the inner cover portion opening 61 which exposes the visible portion 42. On the other hand, the shape of the inner cover portion 6 may be other than the above shapes.

In the above-described embodiment, the adhesive 8 (waterproof material) is provided between the detection portion 2 and the visible portion 42. On the other hand, the waterproof material other than the adhesive 8 may be provided between the detection portion 2 and the visible portion 42 and the waterproof material may not be provided when the waterproofness can be secured.

In the above-described embodiment, the visible portion 42 is provided with the groove portion 47 into which the adhesive 8 is injectable and the groove portion 47 reaches between the detection portion 2 and the visible portion 42 and reaches the inner cover portion 6. On the other hand, the injection position of the adhesive 8 may be other than the above position and the visible portion 42 may not be provided with the groove portion 47.

In the above-described embodiment, the packing 46 is provided between the visible portion 42 and the mounting board 3. On the other hand, the packing 46 may not be provided between the visible portion 42 and the mounting board 3.

In the above-described embodiment, the guard structure 7 includes the inner ring 71, the outer ring 72, the inner rib 73, and the outer rib 74. On the other hand, the guard structure 7 may have a form other than the above forms if the detection portion 2 can be protected.

Further, in the above-described embodiment, the visible portion 42 is disposed between the outer ring 72 and the inner ring 71 of the guard structure 7 in plan view, but is not limited thereto and the visible portion 42 may be disposed inside the inner peripheral edge of the outer cover portion 5 in plan view, that is, the guard structure 7 in plan view. For example, the visible portion 42 may exist in all portions that are exposed from the annular portion opening 53 of the inner cover portion 6 and the visible portion 42 may exist only outside the outer ring 72. At least a part of the visible portion 42 may be disposed inside the guard structure 7 in plan view.

In the above-described embodiment, the indicator lamp 4 displays the operation of the detection portion 2, but the present invention is not limited thereto. The indicator lamp 4 may display other heat detectors 1 in addition to the operation of the detection portion 2. Further, the present invention can be applied to the indicator lamp which does not display the operation of the detection portion 2 in the indicator lamp 4 and performs a display relating to other heat detectors 1.

The display of other heat detectors 1 is, for example, a display of the abnormality of the heat detector 1. The display may be made when the heat detector 1 detects a communication interruption with the higher-level equipment, such as a drop in sensitivity or a drop in power supply voltage.

The display of other heat detectors 1 is, for example, a display associated with the response of the heat detector 1. The display may be a display in the case of the response of the heat detector 1 based on a remote operation test or a lighting command for the heat detector 1 from a host device.

Further, the heat detector 1 may be a wireless heat detector, in which case an indicator lamp may display according to the strength of the radio wave received from the wireless relay.

At least a part of each of the side of the guard structure 7 facing the visible portion 42 and the inner cover portion 6 has a color capable of reflecting visible light emitted from the indicator lamp 4 and the guard structure 7 and the inner cover portion 6 may be made to appear shiny in addition to the visible portion 42. In this way, the heat detector 1 can perform a display relating to the heat detector 1 by using not only the visible light emitted from the indicator lamp 4 but also the light reflected by the guard structure 7 and the inner cover portion 6.

INDUSTRIAL APPLICABILITY

It is possible to miniaturize the mounting board 3 and to reduce the restrictions on the arrangement of the light source device 41 of the indicator lamp 4.

REFERENCE SIGNS LIST

1 Heat detector
2 Detection portion
3 Mounting board
4 Indicator lamp

6 Inner cover portion (cover portion)
7 Guard structure
8 Adhesive (waterproof material)
12 Monitoring area
41 Light source device
42 Visible portion
43 Plate-shaped member
45 Light diffusion portion
46 Packing
47 Groove portion
61 Inner cover portion opening (opening)

What is claimed is:

1. A heat detector comprising:
a detection portion which is exposed to a monitoring area and detects heat;
a guard structure which is provided around the detection portion and protects the detection portion from an external force on the side of the monitoring area; and
an indicator lamp which performs a display relating to the heat detector,
wherein at least a part of the indicator lamp includes a planar visible portion that is either:
inside the guard structure and around the detection portion in plan view and at least a part of the visible portion is visible from the side of the monitoring area over the guard structure; or
disposed in an area protected by the guard structure and at least a part of the planar visible portion is exposed while not overlapping the guard structure in plan view, and
wherein the heat detector further comprises:
a mounting board to which the detection portion is electrically connected, wherein the indicator lamp includes a light source device which is electrically connected to the mounting board, and wherein the visible portion displays light projected from the light source device; and
a cover portion which is provided between the mounting board and the guard structure, wherein the cover portion is provided with an opening that exposes the visible portion.

2. A heat detector comprising:
a detection portion which is exposed to a monitoring area and detects heat;
a guard structure which is provided around the detection portion and protects the detection portion from an external force on the side of the monitoring area; and
an indicator lamp which performs a display relating to the heat detector,
wherein the indicator lamp includes a planar visible portion that is either:
inside the guard structure and around the detection portion in plan view and at least a part of the visible portion is visible from the side of the monitoring area over the guard structure; or
disposed in an area protected by the guard structure and at least a part of the visible portion is exposed while not overlapping the guard structure in plan view, and
wherein a waterproof material is provided between the detection portion and the visible portion.

3. The heat detector according to claim 1,
wherein the visible portion is configured by a part of a plate-shaped member including a transparent or opaque light diffusion portion, and
wherein the light diffusion portion is disposed to overlap the mounting board in plan view.

4. The heat detector according to claim 3, wherein the light diffusion portion is disposed to surround the detection portion.

5. The heat detector according to claim 1, wherein at least a part of each of the side of the guard structure facing the visible portion and the cover portion has a color capable of reflecting visible light emitted from the indicator lamp.

6. The heat detector according claim 1,
wherein a waterproof material is provided between the detection portion and the visible portion.

7. The heat detector according to claim 6, wherein the waterproof material is an adhesive.

8. The heat detector according to claim 7, further comprising:
a mounting board to which the detection portion is electrically connected,
wherein a cover portion is provided between the mounting board and the guard structure,
wherein the cover portion is provided with an opening that exposes the visible portion,
wherein the visible portion is provided with a groove portion into which the adhesive is injectable, and
wherein the groove portion reaches between the detection portion and the visible portion and reaches the cover portion.

9. A heat detector comprising:
a detection portion which is exposed to a monitoring area and detects heat;
a guard structure which is provided around the detection portion and protects the detection portion from an external force on the side of the monitoring area; and
an indicator lamp which performs a display relating to the heat detector,
wherein at least a part of the indicator lamp includes a planar visible portion that is either:
inside the guard structure and around the detection portion in plan view and at least a part of the visible portion is visible from the side of the monitoring area over the guard structure; or
disposed in an area protected by the guard structure and at least a part of the planar visible portion is exposed while not overlapping the guard structure in plan view, and
wherein the heat detector further comprises:
a mounting board to which the detection portion is electrically connected,
wherein a packing is provided between the visible portion and the mounting board.

10. The heat detector according to claim 2, further comprising:
a mounting board to which the detection portion is electrically connected,
wherein the indicator lamp includes a light source device which is electrically connected to the mounting board, and
wherein the visible portion displays light projected from the light source device.

11. The heat detector according to claim 10,
wherein the visible portion is configured by a part of a plate-shaped member including a transparent or opaque light diffusion portion, and
wherein the light diffusion portion is disposed to overlap the mounting board in plan view.

12. The heat detector according to claim 11, wherein the light diffusion portion is disposed to surround the detection portion.

13. The heat detector according to claim 10, further comprising:

a cover portion which is provided between the mounting board and the guard structure, wherein the cover portion is provided with an opening that exposes the visible portion.

14. The heat detector according to claim 13, wherein at least a part of each of the side of the guard structure facing the visible portion and the cover portion has a color capable of reflecting visible light emitted from the indicator lamp.

15. The heat detector according to claim 2, wherein the waterproof material is an adhesive.

16. The heat detector according to claim 15, further comprising:

a mounting board to which the detection portion is electrically connected, wherein a cover portion is provided between the mounting board and the guard structure, wherein the cover portion is provided with an opening that exposes the visible portion, wherein the visible portion is provided with a groove portion into which the adhesive is injectable, and wherein the groove portion reaches between the detection portion and the visible portion and reaches the cover portion.

17. The heat detector according to claim 2, further comprising:

a mounting board to which the detection portion is electrically connected, wherein a packing is provided between the visible portion and the mounting board.

* * * * *